US011441299B2

(12) United States Patent
English

(10) Patent No.: US 11,441,299 B2
(45) Date of Patent: Sep. 13, 2022

(54) RETROFIT DRAIN APPARATUS AND METHOD OF INSTALLATION

(71) Applicant: Ryan English, Henderson, NV (US)

(72) Inventor: Ryan English, Henderson, NV (US)

( * ) Notice: Subject to any disclaimer, the term of this patent is extended or adjusted under 35 U.S.C. 154(b) by 475 days.

(21) Appl. No.: 16/684,352

(22) Filed: Nov. 14, 2019

(65) Prior Publication Data
US 2020/0157790 A1     May 21, 2020

Related U.S. Application Data

(60) Provisional application No. 62/768,888, filed on Nov. 17, 2018.

(51) Int. Cl.
*E03C 1/22* (2006.01)
*E03F 5/04* (2006.01)
*B01D 29/05* (2006.01)
*E03C 1/264* (2006.01)

(52) U.S. Cl.
CPC ............... *E03C 1/22* (2013.01); *B01D 29/05* (2013.01); *E03C 1/264* (2013.01); *E03F 5/0408* (2013.01); *E03C 2201/50* (2013.01); *E03F 2005/0413* (2013.01)

(58) Field of Classification Search
CPC ......... E03F 5/0407; E03F 5/0408; E03F 5/06; E03F 2005/0413; E03C 1/22; E03C 1/26; E03C 1/264; E03C 2201/50; B01D 29/05
USPC ............ 210/163, 164; 4/613, 679, 286, 292; 137/15.07
See application file for complete search history.

(56) References Cited

U.S. PATENT DOCUMENTS

| 4,487,690 A * | 12/1984 | Logsdon | E04D 13/0409 210/163 |
| 5,618,416 A * | 4/1997 | Haefner | E04D 13/0409 210/163 |
| 7,964,095 B1 * | 6/2011 | Graybeal | E03F 5/04 4/292 |
| 8,096,002 B2 * | 1/2012 | Stimpson | E03F 5/0408 210/163 |
| 2004/0200162 A1 * | 10/2004 | Wroblewski | E03F 5/06 52/302.1 |
| 2008/0189926 A1 * | 8/2008 | Luxton | E03F 5/0408 210/163 |
| 2008/0277324 A1 * | 11/2008 | Meyers | E03F 5/0408 210/164 |

(Continued)

*Primary Examiner* — Christopher Upton
(74) *Attorney, Agent, or Firm* — Bayramoglu Law Offices LLC

(57) ABSTRACT

A removable drain includes a grill grate including at least one aperture and at least one grill grate first fastener opening configured to receive a first fastener, and a support flange configured to support the grill grate and configured to be coupled to an existing drain, the support flange having a central opening and including a recessed flange extending into the opening from an interior wall for the support flange and on which the grill grate can be accommodated, at least one first support flange fastener opening configured to receive the first fastener, and at least one second support flange fastener opening configured to receive a second fastener, wherein the grill grate is configured to be detachably coupled to the support flange by the first fastener and wherein the support flange is configured to be detachably coupled to an existing drain structure by the second fastener.

18 Claims, 9 Drawing Sheets

(56) References Cited

U.S. PATENT DOCUMENTS

2019/0242107 A1* 8/2019 McLeod .............. E03F 5/0408

* cited by examiner

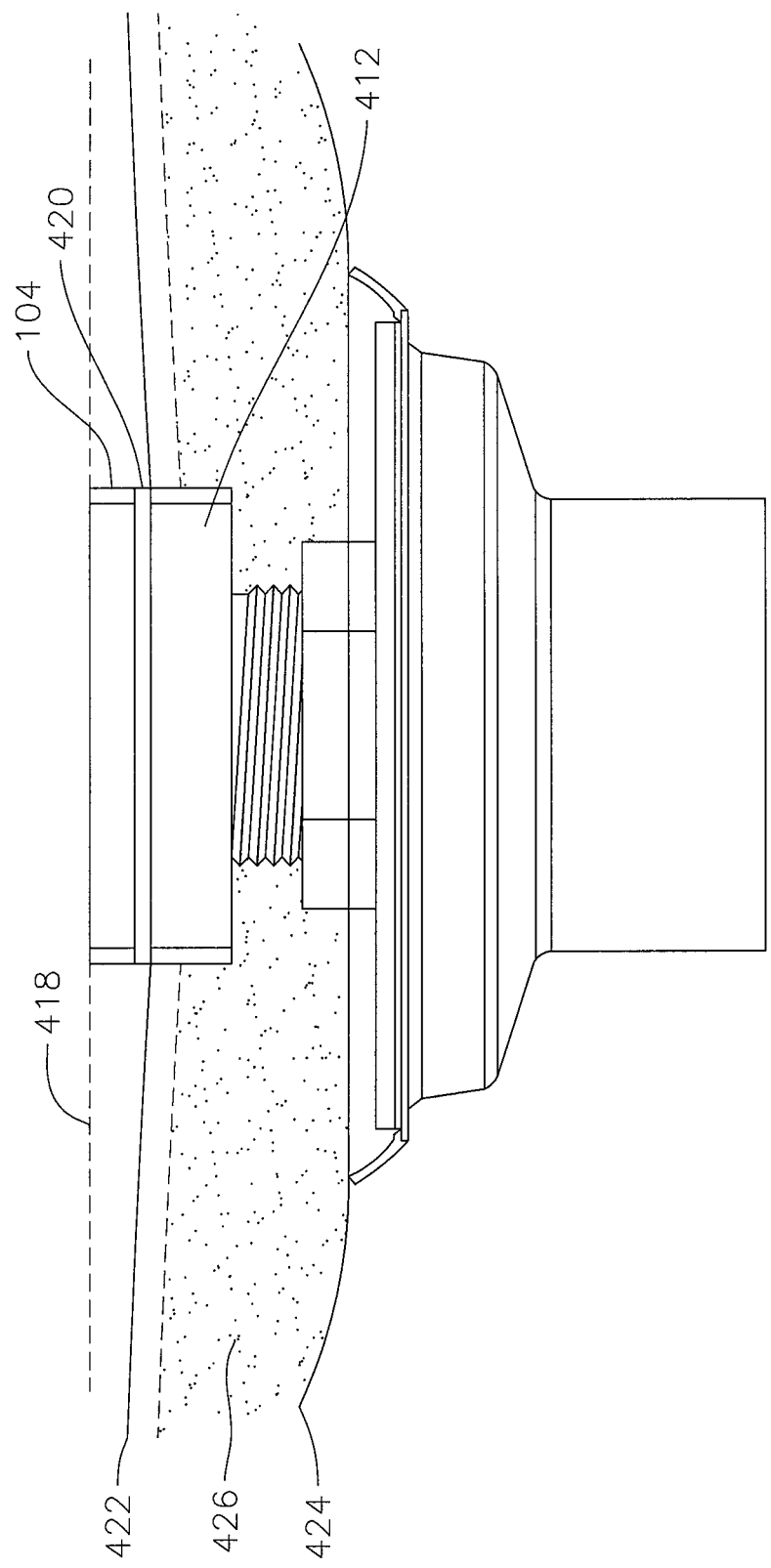

RETROFIT DRAIN APPARATUS AND METHOD OF INSTALLATION

CROSS-REFERENCE TO A RELATED APPLICATION

The present application claims priority to and the benefit of U.S. Provisional Application No. 62/768,888, filed Nov. 17, 2018, entitled "Retrofit Drain Apparatus and Method of Installation", the entire content of which is incorporated herein by reference.

BACKGROUND

(a) Field

The present disclosure relates generally to a removable drain configured to enable replacement of the drain without significantly disrupting the existing drain, flooring and/or the drywall.

(b) Description of the Related Art

A shower drain can provide an important esthetic value to a shower, especially in upscale hotels. A corroded and discolored shower drain could indicate the bathroom is dirty or ill-maintained. Previously, repairing a shower drain without severe damage was extremely difficult and expensive. While the center drain grate can be replaced with relative ease, the surrounding bezel, which is integral to the underlying drain's function, cannot be quickly or readily replaced. Most shower bezels are non-replaceable because they are embedded into the concrete at the time of construction. The procedure to remove and replace a damaged drain typically involves breaking tile, grout, and underlying mortar or concrete to remove the drain bezel, consuming valuable time, money, causing disruption from demolition noise, and putting the drain out of service for an extended period until work is complete. Additionally, broken and removed tile can be difficult to match to existing tile, meaning it may be necessary to remove and replace the entire floor tile. The drain base may be corroded into place, meaning the entire drain assembly and shower pan/membrane may need to be exposed and replaced. Moreover, in the majority of typical shower drains, the drain pipes are still usable. The main issue starts at the bezel of the drain, which is essentially the finish trim that holds the drain grill on and then threads into the sewer pipe. Over time, the drain bezel and the drain grill may become almost inseparable due to the overwhelming corrosion occurring between the two. Typical shower bezels are made from poured brass pot metal and coated with different finishes such as brushed nickel, oil rubbed bronzes, etc. Once the finish coat begins to wear, the corrosion of the shower bezel is a rapid process due to the poor integrity of the brass pot metal which leads to a foul appearing drain. The present invention provides a fast and effective means of fixing irreparable or significant cosmetic damage of an existing shower drain in a permanent manner.

SUMMARY

Aspects of embodiments of the present disclosure relate to a retrofit drain that connects onto an existing drain. In one embodiment, the retrofit drain can be removed intact from its plumbing without disrupting the attached water proofing membrane, the shower pan liner, and the cementitious mortar.

Particularly, in one embodiment, a removable drain may include a grill grate having at least one aperture and at least one grill grate first fastener opening configured to receive a first fastener, and a support flange configured to support the grill grate and configured to be coupled to an existing drain, the support flange having a recessed flange on which the grill grate can be accommodated, at least one first support flange fastener opening configured to receive the first fastener, and at least one second support flange fastener opening configured to receive a second fastener, wherein the grill grate is configured to be detachably coupled to the support flange by the first fastener and wherein the support flange is configured to be detachably coupled to an existing drain structure by the second fastener.

In some embodiments, a top surface of the support flange may include a recess. The grill grate is configured to fit into the recess of the support flange and to be supported by the recessed flange.

In some embodiments, the grill grate is received in the recess of the support flange, a top surface of the grate is substantially flush with the top surface of the support flange.

In some embodiments, when the grill grate is received in the recess of the support flange, a top surface of the grill grate is substantially flush with the top surface of the support flange.

Some embodiments may include a first fastener in the at least one grill grate fastener opening and in the at least one support flange fastener opening to removable couple the support flange to the grill grate.

In some embodiments, the recess flange may include a plurality of lobes configured to support the grill grate, the plurality of lobes extending inward from the recessed flange into a central opening of the support flange.

In some embodiments, each of the at least one grill grate fastener openings are on the respective one of the lobes. The at least one grill grate fastener opening is configured to align with a respective one of the at least one support flange fastener openings when that grill grate is accommodated in the recess of the support flange.

Some embodiments may include a first fastener in the at least one grill grate fastener opening and in the at least one support flange fastener opening to removable couple the support flange to the grill grate.

In another embodiment, the method of installing a removable drain may include removing a drain grate of an existing drain, securing a support flange of the removable drain on top of the existing drain, detachably coupling a grill grate to the support flange, and laying at least one tile on top of an existing tile. The existing tile forms a perimeter of the existing drain. A floor slop is substantially leveled with the surface of the grill grate.

In some embodiments, the support flange is secured directly on top of the existing drain.

In some embodiments, the support flange is secured directly on top of the existing drain through an additional flange by adhesive substance.

In some embodiments, the additional flange attaches to the existing drain by a plurality of extended tabs configured to hold the flange to the ground.

In some embodiments, the top surface of the grill grate is substantially flush with the top surface of the support flange.

In some embodiments, a spacer is added between the existing drain and the support flange.

In one embodiment, the retrofit drain is attached to the existing drain by mechanical fasteners, e.g., screws. In one embodiment, the retrofit drain attaches to the existing drain through an additional flange by adhesive substances, for example, epoxy or grout. In one embodiment, the additional flange attaches to the existing drain by extended tabs that hold the flange to the tile. In some embodiments, the retrofit drain can be made from different materials, e.g., bronze, and/or stainless, and coat with different color for aesthetic purposes.

BRIEF DESCRIPTION OF THE DRAWINGS

FIG. 4B is a sectional view of the retrofit drain of FIG. 1 coupled to an existing drain;

DETAILED DESCRIPTION

Figure 1:
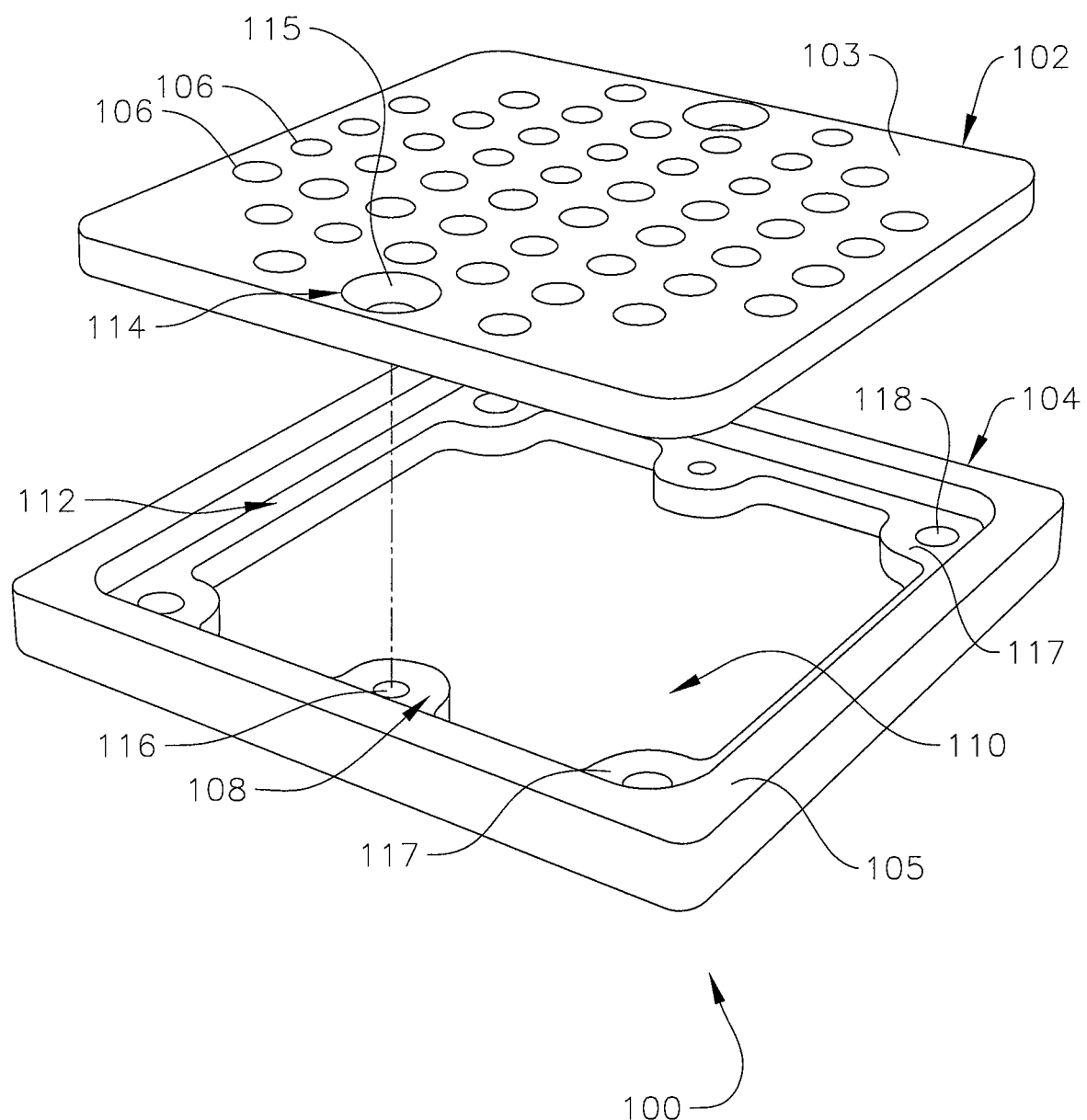
FIG. 1 is a perspective exploded view of portions of an example embodiment of a retrofit drain according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further medications in the described embodiments and any further modifications in the described embodiments and any further applications of the principles of the invention as described herein are contemplated as would normally occur to one skilled in the art to which the invention relates.

FIG. 1 is a perspective exploded view of a retrofit drain 100 in accordance with some embodiments of the present disclosure. In one embodiment, the retrofit drain 100 may include: a grill grate 102 and a support flange 104. The support flange 104 is configured to be detachably coupled to an existing drain and the grill grate 102 is configured to be detachably coupled to the support flange 104. Providing a support flange 104 to which the grill grate 102 is detachably coupled enables repair or replacement of the grill grate 102 without damaging or having to remove other components, such as an attached water proofing membrane, a shower pan liner, and/or cementitious mortar.

In the illustrated embodiment, the grill grate 102 includes a body 103 and one or more apertures 106 (e.g., a series of holes) extending through the body to allow liquid to pass therethrough. As will be appreciated, the apertures 106 can range in size and can be in a number of different configurations generally extending over a partial area of the body 103. However, it will be appreciated that the specific number of apertures 106 and their sizes and configuration are not critical.

In one embodiment, the grill grate body 103 can have a generally uniform thickness such that a top surface and a bottom surface are substantially flat. Further, the body 103 can include at least one, or alternatively, a plurality of fastener openings 114 each configured to receive a fastener to couple the grill grate 102 to the support flange 104, as described in more detail below. Such fastener openings 114 may be the same or a different size from the apertures 106 of the grill grate 102. Additionally, the fastener openings 114 may have a beveled edge 115 to accommodate a fastener 206 and may be located near a lateral edge of the grill grate 102. Particularly, the fastener 206 may be a screw, rivet, or nail (see FIG. 2), but it will be appreciated that any appropriate fastener may be used.

Figure 4A:
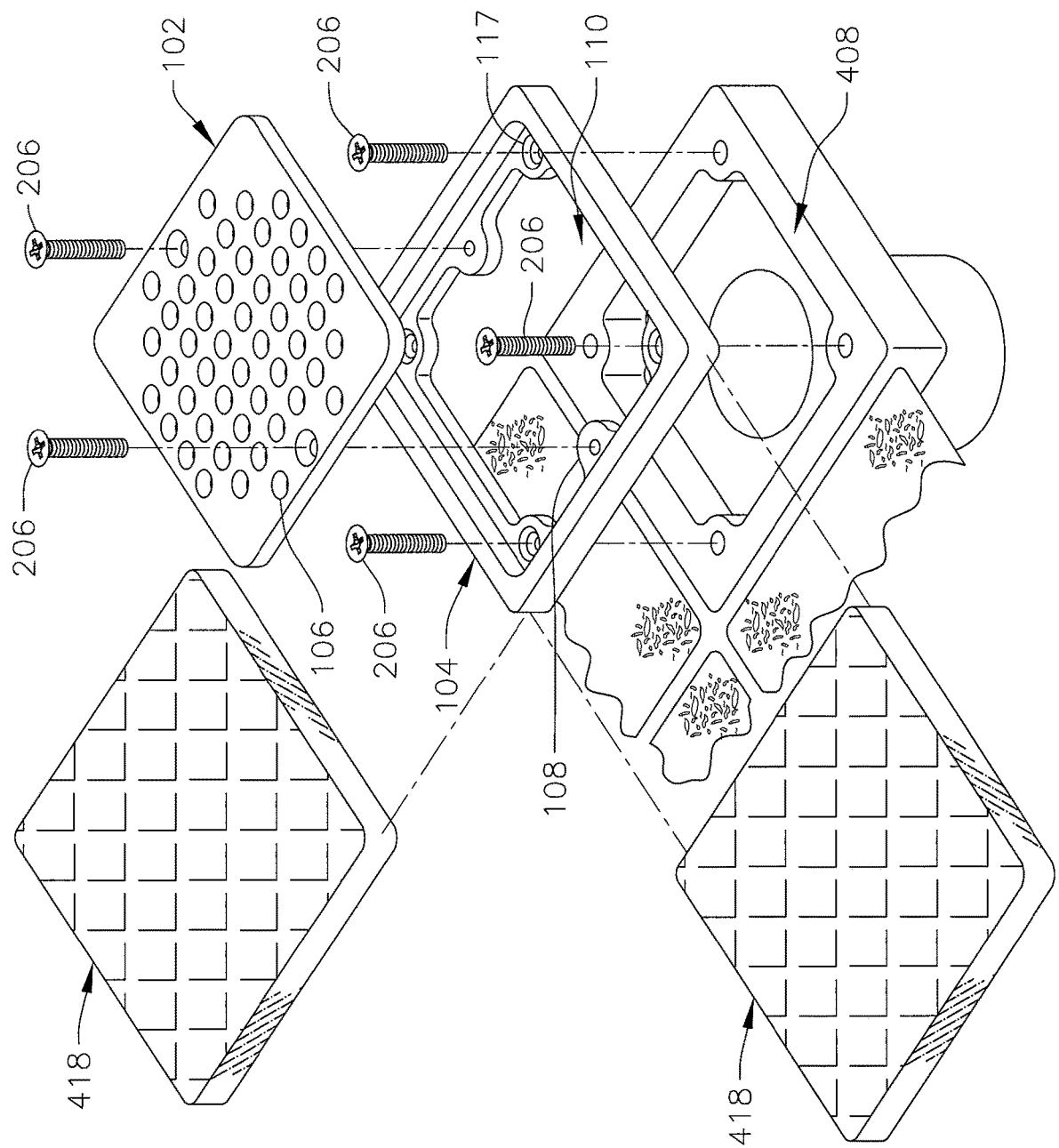
FIG. 4A is a perspective exploded view of the retrofit drain of FIG. 1 coupled to an existing drain.

The support flange 104 includes a supporting frame 105 defining a central opening 110 such that fluid may pass through the one or more apertures 106 in the grill grate 102, through the central opening 110 of the support flange 104, and into the existing drain to which the support flange 104 may be coupled (see FIGS. 4A and 4B). In the illustrated embodiment, the support flange 104 includes a recessed flange 112 which extends around an interior circumference of the support flange 104. Particularly, the recessed flange 112 provides a surface extending inwardly from the supporting frame 105 configured to accommodate the grill grate thereon and the grill grate 102 is configured to be received in the recess of the support flange 104 such that the grill grate 102 rests on the recessed flange 112.

In one or more embodiments, when the grill grate 102 is received or accommodated in the recess of the support flange 104, a top surface of the grill grate 102 is substantially flush with or slightly recessed from a top surface of the support flange 104. In one embodiment, the support flange 104 includes a plurality of central lobes 108 and corner lobes 117 extending inward into the central opening of the support flange 104. In the illustrated embodiment, when the grill grate 102 is received or accommodated on the recessed flange 112 of the support flange 104, portions of the grill grate 102 are supported by the recessed flange 112, including the lobes 108 and 117.

Additionally, as shown in FIG. 1, each central lobe 108 defines a central lobe fastener opening 116 that corresponds to the grill grate fastener opening 114 and is configured to align with the grill grate fastener opening 114 when the grill grate 102 is received or accommodated in the recess of the support flange 104. Accordingly, once the grill grate 102 is received or accommodated in the recess of the support flange 104, one or more fasteners (e.g., one or more screws, rivets, or nails) may be inserted through the one or more fastener openings 114 in the grill grate 102 and into the central lobe fastener openings 116 in the lobes 108 of the support flange 104 to detachably couple the grill grate 102 to the support flange 104. Additionally, each corner lobe 117 of the support flange 104 defines a corner lobe fastener opening 118 configured to receive a fastener to detachably couple the support flange 104 to an existing drain (see FIG. 4).

Figure 2:
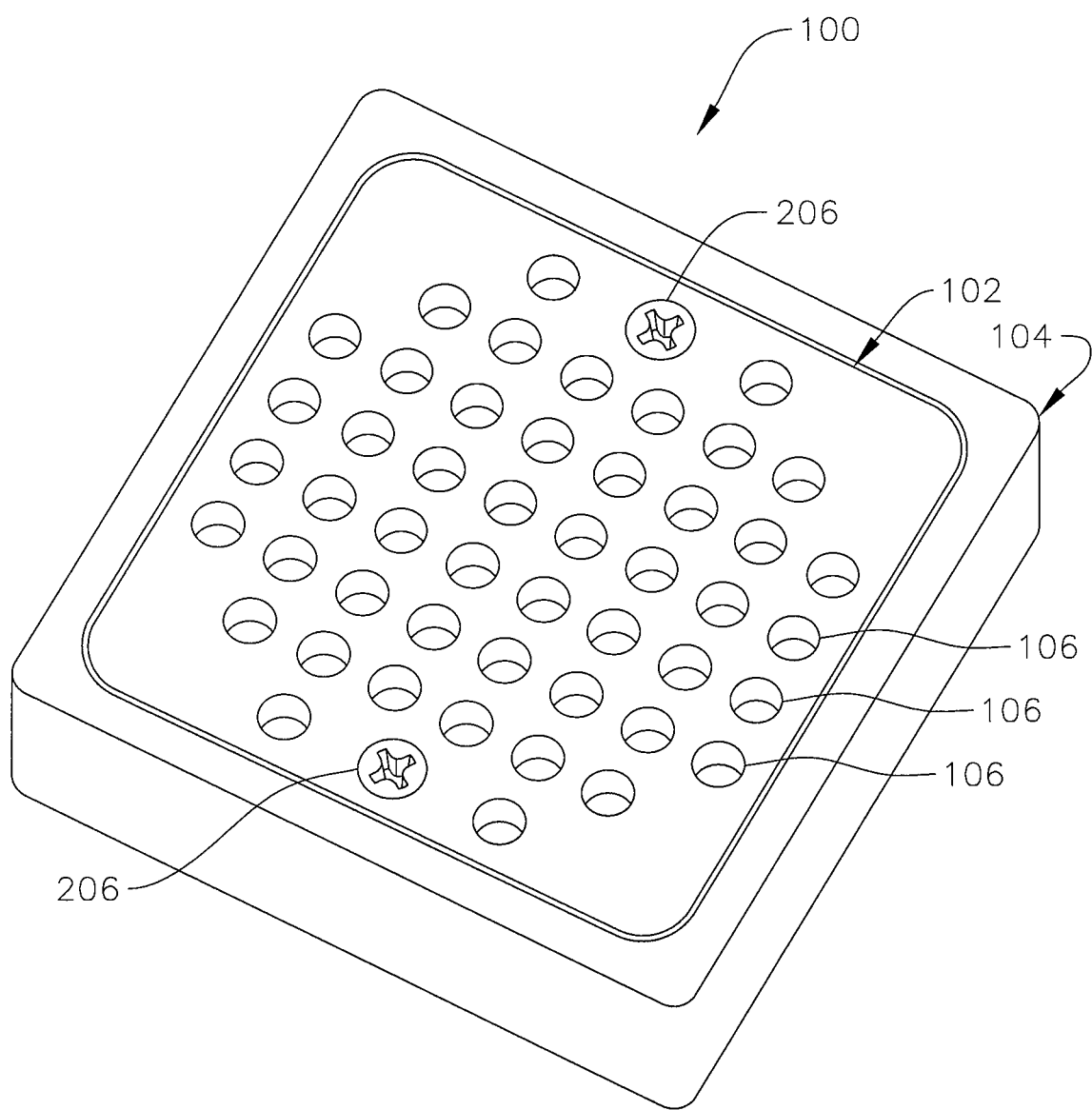
FIG. 2 is a perspective assembled view of the retrofit drain of FIG. 1.

FIG. 2 is a perspective assembled view of a retrofit drain 100 in accordance with the embodiment shown in FIG. 1. In the illustrated embodiment, the grill grate 102 includes a plurality of apertures 106 and is detachably coupled to the support flange 104. The grill grate 102 is received in the recess of the support flange 104 and the top surface of the grill grate 102 substantially flush with the top surface of the supporting flange 104. A plurality of mechanical fasteners 206, e.g., screws, are being inserted through the fastener openings in the grill grate 102 and into the fastener openings in the lobes of the support flange 104 to detachably couple the grill grate 102 to the support flange 104. Referring to FIGS. 1 and 2, it is evident that the grill grate 102 can be removed from the support flange 104 while the support flange remain coupled to an existing drain (FIG. 4A).

Figure 3A:
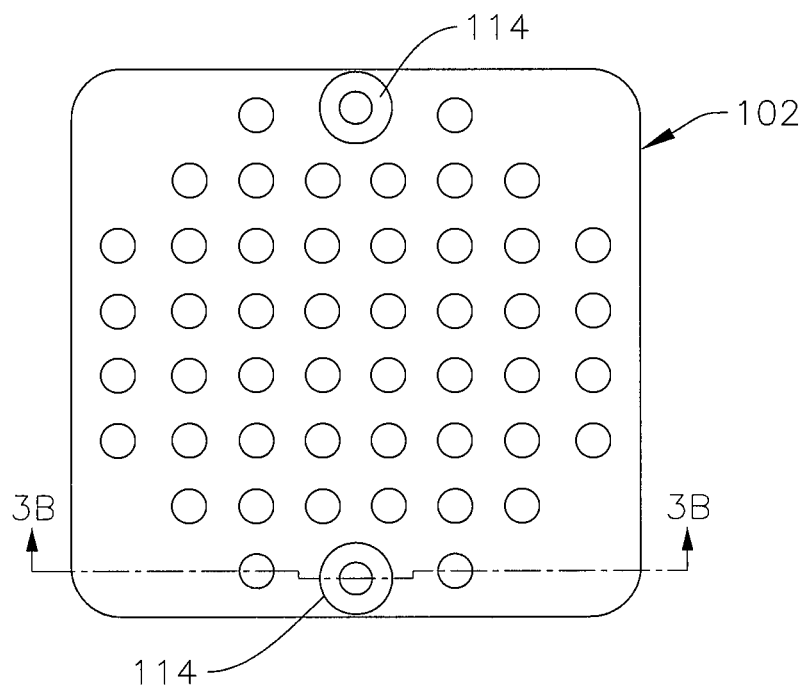
FIG. 3A is a top view of a grill grate of the retrofit drain according to FIG. 1.
Figure 3B:
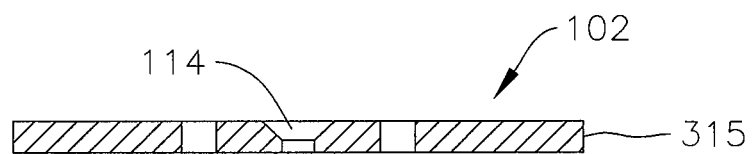
FIG. 3B is a cross-sectional view of the grill grate of the retrofit drain of FIG. 3A taken along the line 3B-3B.
Figure 3C:
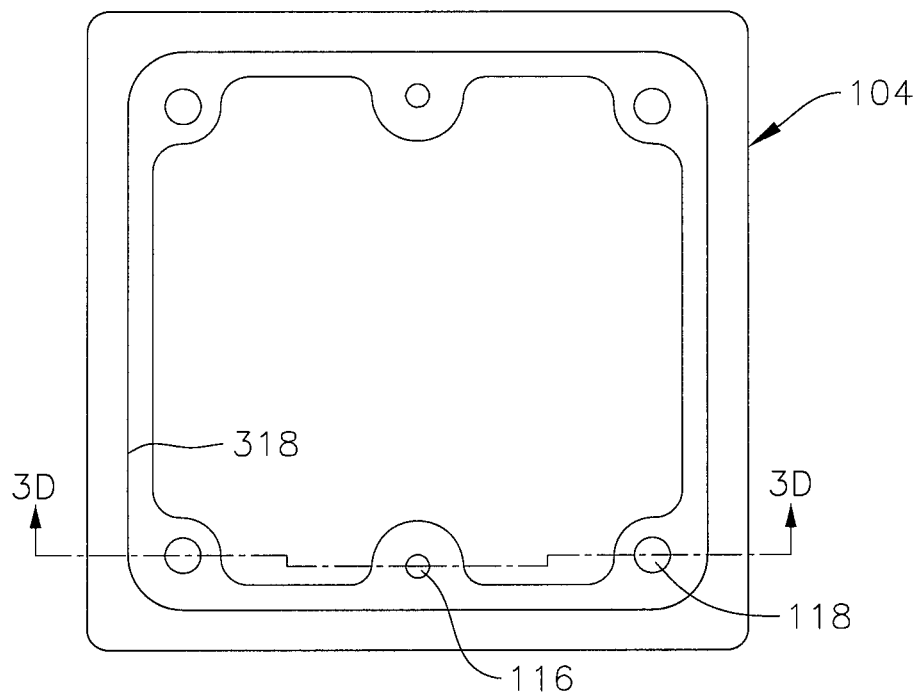
FIG. 3C is a top view of a support flange of the retrofit drain of FIG. 1.
Figure 3D:
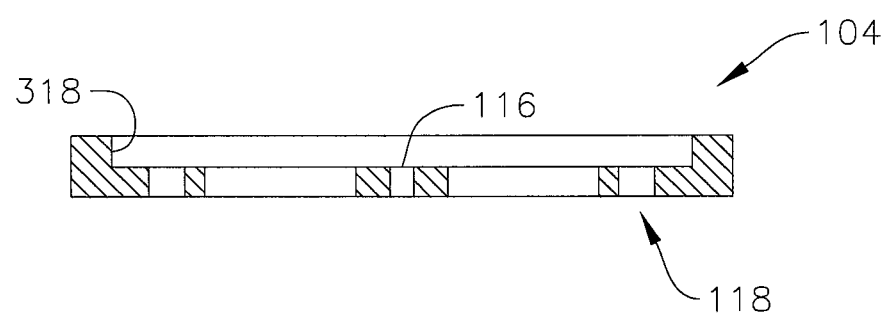
FIG. 3D is a cross-sectional view of the support flange of the retrofit drain of FIG. 3C taken along the line 3D-3D.

FIG. 3A is a grill grate of the retrofit drain 100, FIG. 3B is a cross sectional view of the grill grate 102 through the line 3B-3B shown in FIG. 3A, FIG. 3C is a top view of a support flange of the retrofit drain of FIG. 3A, and FIG. 3D is a cross sectional view of the support flange 104 through the line 3C-3C shown in FIG. 3A in accordance with some embodiments of the present disclosure. In the illustrated embodiment, the grill grate 102 is configured to have a shorter length and a shorter width than the support flange 104 so as to be accommodatable within the support flange 104 on the recessed flange 112. As is evident from FIGS. 3A-3D, in one embodiment the grill grate 102 is sized such that edges 315 of the grill grate are immediately adjacent to the interior wall 318 of the support flange 104. Further, when the grill grate 102 is received or accommodated in the recess of the support flange 104, portions of the grill grate 102 are supported by the center lobes 108 that are extended inward into the central opening of the support flange 104.

In the illustrated embodiment, the grill grate 102 has two fastener openings 114 located on opposite sides of the grill grate. When the grill grate is received or accommodated in the support flange 104, each fastener opening 114 of the grill grate 102 aligns with a fastener opening 116 of the support flange 104. Further, two fasteners (e.g., screws) can be inserted through the two fastener openings 114 in the grill grate 102 and into the fastener openings 116 in the lobes of the support flange 104 to detachably couple the grill grate 102 to the support flange 104. The height (thickness) of the grill grate 102 is configured so that the surface of the grill grate 102 is substantially flush with the surfaces of the support flange 104.

FIG. 4A is a perspective view of a retrofit drain 100 in accordance with the embodiment shown in FIG. 1. In the illustrated embodiment, the support flange 104 is configured to be removably coupled to an existing drain 408 and the grill grate 102 is configured to be detachably coupled to the support flange 104. The grill grate 102 includes a plurality of apertures 106 (e.g., a series of holes) and the support flange 104 includes a central opening 110 such that fluid may pass through the apertures 106 in the grill grate 102, through the central opening of the support flange 110, and into the existing drain 408 to which the support flange 104 is coupled. In the illustrated embodiment, the support flange 104 includes a recess 112 and the grill grate 102 is configured to be received in the recess of the support flange 104. When the grill grate 102 is received in the recess of the support flange 104, the top surface of the grill grate 102 is flush or substantially flush with the top surface of the support flange 104. In the illustrated embodiment, the support flange 104 includes a plurality of lobes 108, 117 extending inward into the central opening of the support flange 104. In the illustrated embodiment, when the grill grate 102 is received in the recess of the support flange 104, portions of the grill grate 102 are supported by the plurality of the lobes 108. Additionally, in the illustrated embodiment, each lobe 108 defines a fastener opening 116, and the grill grate 102 defines a plurality of fastener openings 114 configured to align with the fastener openings 116 in the plurality of the lobes 108 when the grill grate 102 is received in the recess of the support flange 104. Accordingly, once the grill grate 102 is received in the recess of the support flange 104, the plurality of fasteners 206 (e.g., one or more screws) may be inserted through the plurality of fastener openings in the grill grate 102 and into the fastener openings 116 in the lobes 108 of the support flange 104 to detachably couple the grill grate 102 to the support flange 406.

FIG. 4B is a sectional view of a retrofit drain in accordance with some embodiments of the present disclosure. As is apparent from FIG. 4B, the retrofit drain structure 100 including the support flange 104 and the grill grate 102 can be coupled to an existing drain structure 408 without having to remove or destroy any portion of such existing drain structure. Particularly, the support flange 104 can be coupled on top of the existing drain structure 408 and tiles 418 can be placed around the retrofit drain to provide a floor surface. The installation process of the present invention is simplified. In the illustrated embodiment, the installation process includes removing the drain grate from existing drain structure 408, securing the support flange 104 directly on top of the existing drain using a plurality of fasteners, e.g., one or more screws, or adhesive. The retrofit drain support flange 104 can be custom sized to fit onto most commercial drain bases. In some embodiments, an optional spacer 420 may be installed between the existing drain structure 408 and the retrofit drain support flange 104 to adjust for any additional elevation need. New tiles 418 can be installed directly on top of the exiting tile 422 to raise the floor slope to be leveled with the support flange 406 of the retrofit drain. Installation of the new tiles 418 only requires simple surface preparation, and causes little or no damage to the other surrounding components, such as the attached water proofing membrane 424 and the cementitious mortar 426. In some embodiment, the material for the retrofit drain is made with materials that will not show wear and tear, such as stainless steel, as opposed to the typical coasted brass drain.

Figure 5:
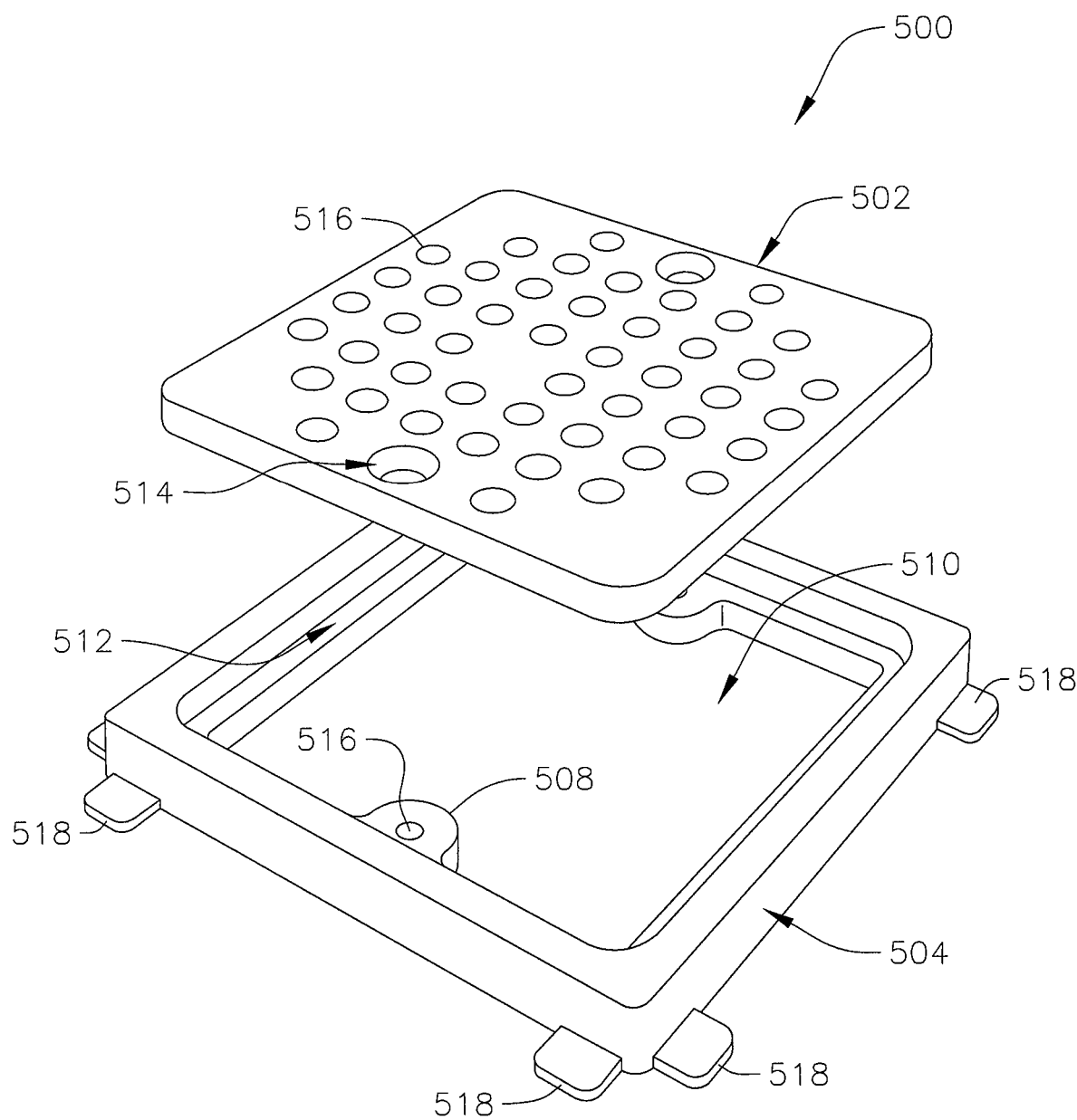
FIG. 5 is a perspective exploded view of another example embodiment of a retrofit drain according to the present disclosure.

FIG. 5 is a perspective view of a retrofit drain 500 in accordance with some embodiments of the present disclosure. The primary components of the retrofit drain 500 include: a grill grate 502 and a support flange 504. The support flange 504 is configured to be coupled to an existing drain and the grill grate 502 is configured to be detachably coupled to the support flange 504. Providing a support flange 504 to which the grill grate 502 is detachably coupled enables replacement of the grill grate 502 without damaging other components, such as an attached water proofing membrane, a shower pan liner, and/or cementitious mortar. In the illustrated embodiment, the grill grate 502 includes one or more apertures 506 (e.g., a series of holes) and the support flange 504 includes a central opening 510 such that fluid may pass through the one or more apertures 510 in the grill grate 502, through the central opening 510 of the support flange 504, and into the existing drain to which the support flange 504 is coupled. In the illustrated embodiment, the support flange 504 includes a recess 512 and the grill grate 502 is configured to be received in the recess 512 of the support flange 504. In one or more embodiments, when the grill grate 502 is received in the recess 512 of the support flange 504, a top surface of the grill grate 502 is flush or substantially flush with a top surface of the support flange 504. In the illustrated embodiments, the support flange 504 includes a plurality of lobes 508 extending inward into the central opening of the support flange 504. In the illustrated embodiment, when the grill grate 502 is received in the recess of the support flange 504, portions of the grill grate 502 are supported by the lobes 508. Additionally, in the illustrated embodiment, each lobe 508 defines a fastener opening 516 and the grill grate 502 defines at least one fastener opening 514 configured to align with the fastener opening 516 in at least one of the lobes 508 when the grill grate 502 is received in the recess 512 of the support flange 504. Accordingly, once the grill grate 502 is received in the recess 512 of the support flange 504, one or more fasteners (e.g., one or more screws) may be inserted through the one or more fastener openings in the grill grate 502 and into the fastener openings in the lobes 508 of the support flange 104 to detachably couple the grill grate 102 to the support flange 504.

In the illustrated embodiment shown in FIG. 5, the support flange 504 also includes a plurality of tabs 518 extended outwards configured to be inserted into or underneath the surrounding material, e.g., tile or mortar, to secure the support flange 504 to the existing drain. In one embodiment, two tabs 518 extend from each corner of the support flange 504, particularly, one tab 518 extending from a first side wall 618 of the support flange 504 and one tab 518 extending from a second adjacent side wall of the support flange 504 at substantially 90 degrees from one another. Accordingly, the supporting flange 504 can be supported at each corner from the eight support tabs 518.

Figure 6A:
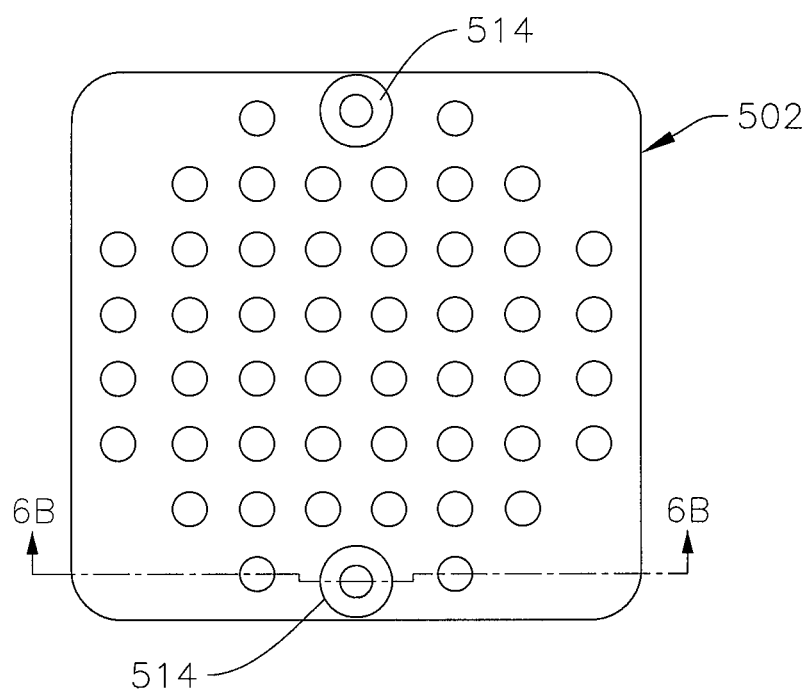
FIG. 6A is a top view of a grill grate of the retrofit drain of FIG. 5.
Figure 6B:
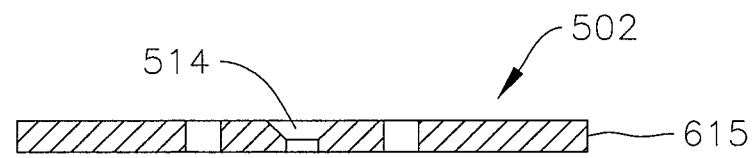
FIG. 6B is a cross-sectional view of the grill grate of the retrofit drain of FIG. 6A taken along the line 6B-6B.
Figure 6C:
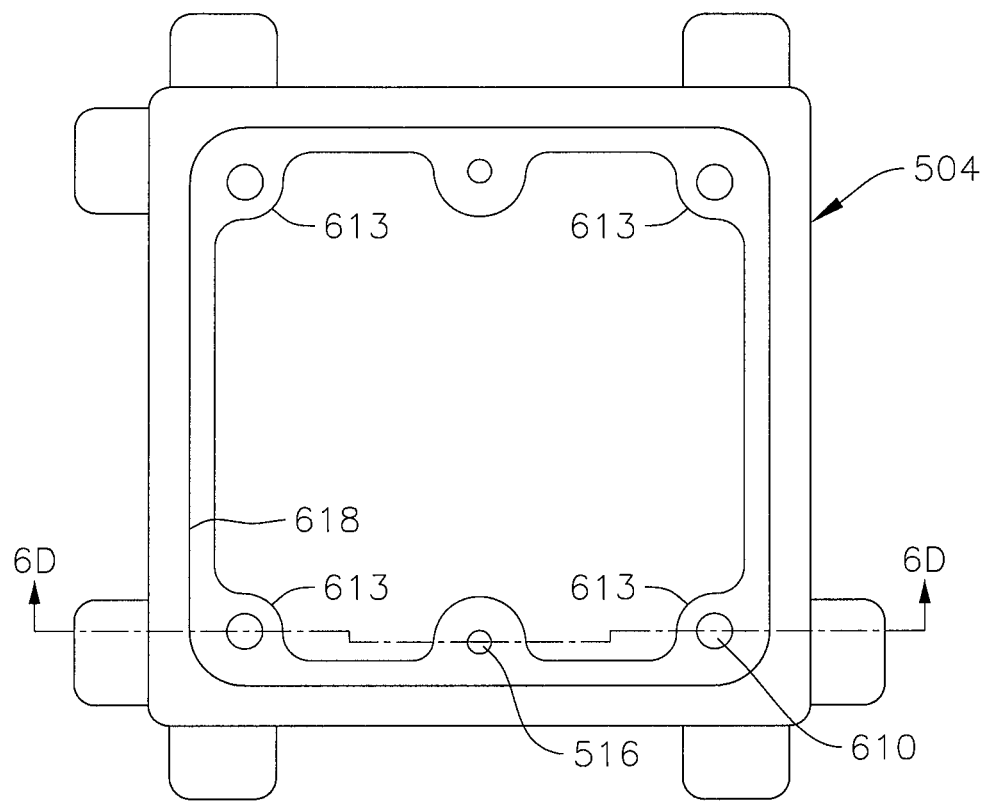
FIG. 6C is a top view of a support flange of the retrofit drain of FIG. 5.
Figure 6D:
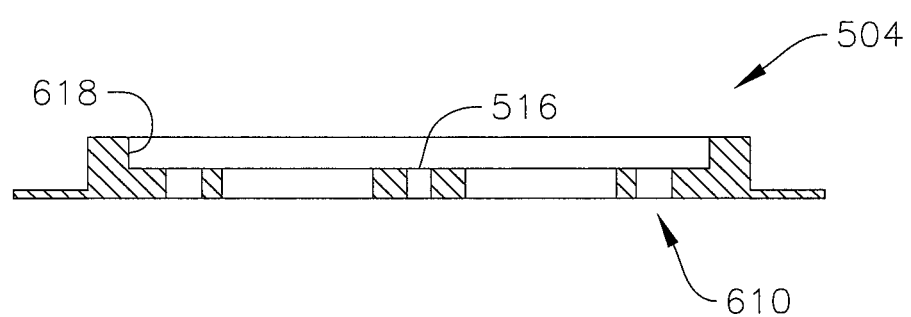
FIG. 6D is a cross-sectional view of the support flange of the retrofit drain of FIG. 6C taken along the line 6D-6D.

With reference to FIGS. 6A-6D, which respectively show a top view of the grill grate of the retrofit drain of FIG. 5, a cross-section of the grill grate of the retrofit drain of FIG. 6A, a top view of a support flange of the retrofit drain of FIG. 5, and a cross section of the support flange of the retrofit drain of FIG. 6C. In the illustrated embodiment, the grill grate 502 is configured to have a shorter length and a shorter width with respect to the support flange 504. The grill grate 502 is received in the recess of the support flange 504. Portions of the grill grate 502 are supported by two lobes 508 that are extended inward into the central opening 510 of the support flange 504. In one embodiment, the support flange 504 includes a plurality of corner lobes 613 extending inward into the central opening of the support flange 504. Each corner lobe 613 of the support flange 504 defines a corner lobe fastener opening 610 configured to receive a fastener to detachably couple the support flange 504. As is evident from FIGS. 6A-6D, in one embodiment the grill grate 502 is sized such that edges 615 of the grill grate are immediately adjacent to the interior wall 618 of the support flange 504. In the illustrated embodiment, two fasteners (e.g., screws) are inserted through two fastener openings 514 in the grill grate 502 and into the fastener openings 516 in the lobes 508 of the support flange 504 to detachably couple the grill grate 502 to the support flange 504. The height (thickness) of the grill grate 502 is configured so that the surface of the grill grate 502 is flush or substantially flush with the surfaces of the support flange 504.

While the present disclosure has been described with reference to exemplary embodiments, it will be apparent to those skilled in the art that various changes and modifications may be made without departing from the spirit and scope of the present invention. Therefore, the above embodiments are provided for illustrative purposes only, and should not in any sense be interpreted as limiting the scope of the present disclosure.

The invention claimed is:

1. A removable shower drain comprising:
a grill grate comprising at least one aperture and at least one grill grate first fastener opening configured to receive a first fastener; and
a support flange configured to support the grill grate and configured to be coupled to an existing shower drain, the support flange having a central opening and comprising a recessed flange extending into the central opening from an interior wall for the support flange and on which the grill grate can be accommodated, at least one first support flange fastener opening configured to receive the first fastener, and at least one second support flange fastener opening configured to receive a second fastener;
wherein the grill grate is configured to be detachably coupled to the support flange by the first fastener and wherein the support flange is configured to be detachably coupled to a structure of the existing shower drain by the second fastener; and
wherein the support flange allows a new tile to be installed directly on top of an existing tile and raises a floor slope to be leveled with the support flange.

2. The removable shower drain of claim 1, wherein the recessed flange is recessed from a top surface of the support flange, and wherein when the grill grate is supported by the recessed flange, a top surface of the grill grate is flush with or recessed from the top surface of the support flange.

3. The removable shower drain of claim 2, wherein, when the grill grate is received in the recess of the support flange, a top surface of the grill grate is substantially flush with the top surface of the support flange.

4. The removable shower drain of claim 1, further comprising a first fastener in the at least one grill grate fastener opening and in the at least one support flange fastener opening to removably couple the support flange to the grill grate.

5. The removable shower drain of claim 1, wherein the recessed flange includes a plurality of lobes configured to support the grill grate, the plurality of lobes extending inward from the recessed flange into the central opening of the support flange.

6. The removable shower drain of claim 5, wherein each of the at least one grill grate fastener openings are on a respective one of the lobes, wherein the at least one grill grate fastener opening is configured to align with a respective one of the at least one support flange fastener openings when the grill grate is accommodated in the recess of the support flange.

7. The removable shower drain of claim 6, further comprising a first fastener in the at least one grill grate fastener opening and in the at least one support flange fastener opening to removably couple the support flange to the grill grate.

8. The removable shower drain of claim 1, wherein the support flange is secured directly on top of the existing shower drain.

9. The removable shower drain of claim 8, wherein the support flange is secured directly on top of the existing shower drain through an additional flange by adhesive substance.

10. The removable shower drain of claim 9, wherein the additional flange attaches to the existing shower drain by a plurality of extended tabs configured to hold the flange to the ground.

11. The removable shower drain of claim 8, wherein the top surface of the grill grate is substantially flush with the top surface of the support flange.

12. The removable shower drain of claim 1, wherein a spacer is added between the existing shower drain and the support flange.

13. A method of installing a removable drain, the method comprising:
- removing a drain grate of an existing drain;
- securing a support flange of the removable drain on top of the existing drain;
- detachably coupling a grill grate to the support flange; and
- laying at least one tile on top of an existing tile, wherein the existing tile forms a perimeter of the existing drain, wherein a floor slope is substantially leveled with the surface of the grill grate.

14. The method of claim 13, wherein the support flange is secured directly on top of the existing drain.

15. The method of claim 13, wherein a spacer is added between the existing drain and the support flange.

16. The method of claim 14, wherein the support flange is secured directly on top of the existing drain through an additional flange by adhesive substance.

17. The method of claim 14, wherein the top surface of the grill grate is substantially flush with the top surface of the support flange.

18. The method of claim 16, wherein the additional flange attaches to the existing drain by a plurality of extended tabs configured to hold the flange to the ground.

\* \* \* \* \*